2,980,653

MANUFACTURE OF LOW MOLECULAR WEIGHT OLEFIN/MALEIC ANHYDRIDE COPOLYMERS

John H. Johnson, Dayton, Ohio, assignor to Monsanto Chemical Company, St. Louis, Mo., a corporation of Delaware No Drawing. Filed Dec. 21, 1956, Ser. No. 629,795

11 Claims. (Cl. 260—78.5)

This invention relates to the production of low molecular weight olefin/maleic anhydride copolymers. In some of its aspects the invention pertains to the copolymerization of maleic anhydride with ethylene and/or propylene and/or butene in the presence of particular materials which result in the production of low molecular weight copolymers, particularly ethylene/maleic anhydride copolymers having a specific viscosity not in excess of 0.2 as determined on a solution of one weight percent of the copolymer in dimethylformamide at 25° C.

Copolymers of maleic anhydride with all sorts of copolymerizable unsaturated organic compounds have been known for many years. It is known to copolymerize maleic anhydride with the lower olefin hydrocarbons, the resulting copolymers containing substantially equimolar proportions of maleic anhydride and the olefin combined therein. The copolymerization is advantageously effected by subjecting a solution of maleic anhydride in an organic diluent, e.g., benzene, to a superatmospheric olefin pressure, employing a peroxide catalyst and elevated temperatures. In many instances where a comparatively high molecular weight copolymer is desired, this procedure is adequate. However, it has been found difficult to produce low molecular weight olefin/maleic anhydride copolymers, which find various uses such as deflocculants and thinners for drilling muds and dispersants for pigments. While especially elevated temperatures, e.g., those above 100° C., tend to result in a product of lowered molecular weight, the physical form is not desirable; it appears that high temperatures cause a softening of the copolymer product which forms as a more or less insoluble solid in suspension in the diluent or solvent used, and the softened particles of polymer tend to agglomerate, as well as accumulate on the walls of the reaction vessel and stirrer, if any is used. While for many polymerizations an increase in the amount of catalyst causes a decrease in molecular weight of the polymer, this particular system is not very sensitive to catalyst concentration at least insofar as reflected in a change in molecular weight.

In accordance with the present invention in preferred aspects, the copolymerization of maleic anhydride with a $C_2$ to $C_4$ olefin is effected in the presence of a hydrocarbon carboxylic acid free from aliphatic unsaturation and having at least one hydrogen atom on α-carbon. By α-carbon is meant a carbon atom attached to a carboxyl, i.e., —COOH, group. By hydrocarbon carboxylic acid is meant an organic compound whose only constituents other than one or more carboxyl groups are hydrogen and carbon, i.e., a mono- or poly-carboxylic acid free from nonhydrocarbon substituents. By such a compound free from aliphatic unsaturation is meant one which contains neither ethylenic nor acetylenic linkages in either open chain or ring structures, but which may contain one or more aromatic rings. Of the class of carboxylic acids above defined, the alkanoic acids are in general preferred. Other preferred carboxylic acids are those in which the α-carbon atom has one or two hydrogen atoms and also is substituted by an aryl radical through aromatic carbon. While carboxylic acids having more than one carboxyl group in the molecule, i.e., dicarboxylic acids, tricarboxylic acids, etc., can be used, they are usually considerably more expensive than the monocarboxylic acids and hence the latter are usually preferred. The carboxylic acids which are normally liquid, i.e., liquid at ordinary room temperature, say 20° C., or at least which are liquid at the temperature and pressure conditions employed for the copolymerization are most convenient to use. In any event, the carboxylic acid chosen should be soluble in the reaction mixture, which may contain a liquid inert solvent or diluent, to an extent sufficient to result in the desired lowering of the molecular weight of the copolymer product.

The carboxylic acids employed in the present invention permit the production of ethylene/maleic anhydride copolymers, propylene/maleic anhydride copolymers, and butene/maleic anhydride copolymers, having low molecular weights desired for certain purposes. By way of example, but not limitation, of suitable carboxylic acids that can be employed in practicing the present invention, there are mentioned: acetic acid, propionic acid, n-butyric acid, isobutyric acid, n-valeric acid, 2-methylbutanoic-4 acid, 3-methylbutanoic-4 acid, the various isomeric hexanoic, heptanoic, octanoic and higher acids having at least one H on α-C, stearic acid, cyclohexane carboxylic acid, 2-methylcyclopentane carboxylic acid, 3-ethylcyclopentane carboxylic acid, 1,4-diisopropylcyclohexane-2-carboxylic acid, phenylacetic acid, ditolylacetic acid, α-naphthylacetic acid, β-naphthylacetic acid, terephthalic acid, isophthalic acid, succinic acid, cyclohexane-1,3-dicarboxylic acid, adipic acid, malonic acid, butane 1,2,3,4-tetracarboxylic acid. There is usually no advantage in the acids having more than 25 carbon atoms per molecule, and those having from 2 to 15 carbon atoms per molecule are preferred.

The quantity of the particular carboxylic acid employed will fall within a rather wide range. A preferred range is from 5 to 25 mole percent of the carboxylic acid, based on the reacting monomers (assuming 100% conversion), i.e., from 5 to 25 moles of the carboxylic acid per 50 moles maleic anhydride charged (50 moles maleic anhydride will theoretically react with 50 moles of the olefin, this making 100 moles of "reacting monomers"). The same basis is meant herein when mole percent catalyst is mentioned. For most purposes I prefer to use from 10 to 20 mole percent of the carboxylic acid. At otherwise fixed reaction conditions, the higher the percentage of carboxylic acid the lower the molecular weight of the resulting copolymer. The amount of acid used is one of several interdependent reaction variables which affect the molecular weight of the product. The more important of the other such variables are the reaction temperature and the reaction pressure (upon which the hydrocarbon monomer concentration depends). In general, the higher the temperature, the lower the molecular weight, and the higher the pressure, the higher the molecular weight. However, the temperature should not be increased too much for the reasons discussed hereinabove. Also, the pressure should not be lowered too much or the yield of copolymer tends to decrease to an undue extent. Lower pressures are more suitable in the cases of propylene and isobutylene copolymers when the vapor pressures of the olefin at a given temperature are lower than in the case of ethylene. I prefer to employ a reaction temperature within the range of 40 to 80° C., and 60 to 80° C. is especially advantageous. At such temperatures, the reaction rate is good and the physical form of the copolymer product is good. The reaction pressure can be atmospheric or below, but is preferably superatmospheric. It is preferred that the reaction be carried out in a closed vessel such as a stirred autoclave, rocking bomb, tubular reactor through which reaction mixture flows, or the like, at a pressure above atmospheric pressure. The pressure is preferably above 100 pounds per square inch gauge for the preparation of ethylene/maleic anhydride copolymers, and pressures of 150 to 400 pounds per square inch gauge are especially preferred. However, even higher pressures, say up to 1000 pounds per square inch gauge and above, are permissible. As pointed out hereinafter, in general, the higher the pressure the higher the molecular weight and hence the greater the quantity of carboxylic acid required.

The olefin reactant can be a single olefin or a mixture of any two or more of the olefins ethylene, propylene, isobutylene, butene-1, butene-2-cis, and butene-2-trans. Preferred olefins are ethylene, propylene and isobutylene. While the maleic anhydride copolymers of these olefins have many attributes in common, there are also important differences among the products as well as among the optimum ranges of reaction conditions to be employed in making them. Thus, reaction pressures can be significantly lower when higher boiling olefin monomers are used. For example, adequate olefin monomer concentration can be obtained at pressures ranging from 50-200 p.s.i. when propylene is involved; with isobutylene, essentially atmospheric pressures are sufficient, but higher pressures can be used. The properties of the copolymers differ markedly with the olefin monomer with particular reference to acid strength of the copolymers which have been hydrolyzed to the free acid form and chemical reactivity of both the anhydride and the acids. In general, the greater the degree of substitution on the ethylene group, the lesser are both acid strengths and chemical reactivity (i.e., ease of esterification, etc.). The invention will be discussed in more detail referring to ethylene/maleic anhydride copolymers by way of example, and application of same to the other olefins will be apparent, bearing in mind the foregoing comments.

The copolymer product contains essentially one mole of total olefin per one mole of maleic anhydride combined therein, irrespective of the relative proportions of ethylene or other olefin or mixture of olefins on the one hand, and maleic anhydride on the other hand, introduced to the reaction system. The ratio of free olefin, e.g., ethylene, available for reaction, to free maleic anhydride available for reaction, at any given time depends upon a variety of factors, including particularly the quantity of free maleic anhydride dissolved in the solvent and the quantity of ethylene dissolved in the solvent. The latter value in turn depends upon the solubility of ethylene in the reaction mixture, which is a function of the particular solvent, the temperature, the pressure, and the concentration of maleic anhydride in the solvent. It is much preferred that by the time the reaction has been completed, an excess of ethylene over that required to react with the entire quantity of maleic anhydride shall have been furnished to the reaction mixture, so as to give maximum utilization of the maleic anhydride. (This is less necessary with propylene and isobutylene, and with these olefins, especially the latter, an effective manner of operating is to charge initially all the maleic anhydride and less than the stoichiometric amount of olefin and intermittently or continuously add olefin until the total charged is just equal to or slightly more than the stoichiometric quantity.) Any unreacted ethylene is readily recovered and recycled to the reaction. The ethylene, maleic anhydride, solvent or diluent, and carboxylic acid can be brought together in various ways, but in any event thorough intermixture of same should be provided. Thus, the reaction can be conducted in a batch, into which ethylene is continuously or intermittently added to maintain pressure until all the maleic anhydride is used up by copolymerization. A similar operation can be conducted wherein maleic anhydride is added continuously or intermittently. The components of the reaction mixture can be continuously fed into a stirred autoclave with continuous overflow of total reaction mixture out of the autoclave either to recovery steps or through a series of autoclaves. A total reaction mixture can be passed through an elongated reaction tube, with ethylene and/or maleic anhydride and/or catalyst and/or carboxylic acid being added at one or more points along the length of the tube if desired.

It is most convenient to carry out the reaction in the presence of an organic solvent for the maleic anhydride. Such solvent is preferably also a non-solvent for the copolymer product. Such materials which can be termed solvents or diluents are advantageously aliphatic or aromatic hydrocarbons or chlorinated hydrocarbons, for example, benzene, toluene, xylene, n-hexane, mixed hexanes, octane, ethylene dichloride, propylene dichloride, chlorobenzene, the dichlorobenzenes, and the like. Since the solvent preferably has a high capacity for dissolving maleic anhydride, it is desirable when a poor solvent for maleic anhydride, such as hexane, is employed to have mixed therewith a good solvent for maleic anhydride, such as ethylene dichloride or benzene. While the proportion of the total solvent to the other components of the reaction mixture can be varied over a wide range, it is preferred to employ an amount such that the final reaction mixture will have a solids content (calculated on the assumption that all maleic anhydride has copolymerized) within the range of 5 to 30 weight percent.

The copolymerization is effected in the presence of a catalyst of free-radical promoting type, principal among which are peroxide-type polymerization catalysts and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include: benzoyl peroxide, lauroyl peroxide, tertiary butyl peroxide, 2,4-dichlorobenzoyl peroxide, tertiary butyl hydroperoxide, diacetyl peroxide, diethylperoxycarbonate, dimethylphenylhydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N=N— wherein the indicated valences can be attached to a wide variety of organic radicals, at least one, however, preferably being attached to a tertiary carbon atom. By way of example of suitable azo-type catalysts can be mentioned $\alpha,\alpha'$-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyl-diazoaminobenzene. The peroxy type or azo type or other free radical promoting type of polymerization catalyst is used in small but catalytic amounts, which generally are not in excess of 1 to 2 mole percent, based on the reacting monomers as above defined. A suitable quantity is often in the range of 0.1 to 1.0 mole percent.

The quantity of the carboxylic acid employed will be chosen which, in combination with the other reaction variables, will result in the production of an ethylene/maleic anhydride copolymer having a specific viscosity less than that obtained if the acid is not used. In general, the specific viscosity should be not in excess of about 0.3, as determined on a one weight percent solution of the copolymer product in dimethylformamide, the viscosity measurement being made at 25° C. The preferred range of specific viscosities for ethylene/maleic anhydride copolymers is from 0.05 to 0.2, and a value of less than 0.15 is preferred for most uses to which the copolymer may be put. Since there are certain inherent viscosity differences depending upon the olefin employed, the preferred range of specific viscosities for the carboxylic acid regulated copolymers will vary. This is due to the effects of olefin substitution upon the degree of coiling for the polymer chain which results in varying solution viscosities for different polymers of equivalent molecular weights. Thus, the preferred specific viscosity range for propylene/maleic anhydride copolymer is from 0.10 to 0.40 and for isobutylene/maleic anhydride copolymer from 0.20 to 1.0. To obtain polymers having these specific viscosities, the amount of carboxylic acid employed will in most cases be within the range of 5 to 25 mole percent based on reacting monomers as hereinabove defined. Any unreacted carboxylic acid remaining present in the final reaction mixture can be recovered and returned to the process for further use.

The commercial form of maleic anhydride is satisfactory for use in the present invention. Where exposure to moisture has occurred and the maleic anhydride is contaminated with maleic acid, it is preferred to dissolve the material in the solvent to be used in the reaction, and separate by filtration or centrifuging or otherwise any maleic acid present, which is not dissolved by the solvent. In other words a maleic acid-free reaction mixture is preferred. As pointed out before, the copolymer product generally separates as a solid insoluble in the reaction mixture. It can be separated therefrom by centrifuging or filtration as desired, and then is preferably washed with a hot organic solvent for maleic anhydride, such as benzene at 100° F., sufficiently to remove any unreacted maleic anhydride from the copolymer product. The copolymer is then subjected to any conventional drying procedure to remove any residual solvent. As an alternative procedure for isolation, the polymer slurry can be direct dried in a vacuum-pan drier.

The low molecular weight olefin/maleic anhydride copolymers produced by the practice of the present invention find particular use as dispersants in numerous industrial fields. They have been found to be outstanding in their ability to thin drilling muds, i.e., aqueous suspensions of clay or other finely divided inorganic solids used in the drilling of oil wells. The low molecular weight copolymers are also dispersants for inorganic pigments, for clay slips used in the ceramics industry, for clay coatings for paper, and the like. The copolymer can be employed as such, i.e., in the anhydride form, and hydrolysis to the free acid or salt, if salt-forming materials are present, occurs in the aqueous medium in which the polymer is being used. Alternatively, the copolymer before use can first be converted to the free acid form by hydrolysis, or to the form of its alkali metal or other metal salts, ammonium salts, amine salts, partial or complete ester or amide, and the like, as may be desired for any particular purpose.

EXAMPLES

The following examples are provided to give an indication of suitable olefin, solvent, catalyst, and carboxylic acids, and proportions of same, as well as suitable temperature and pressure conditions for the copolymerization. However, it will be understood that variations from the specific details given can be made without departing from the invention.

*Control*

A three-liter rocking autoclave was charged with 267 grams maleic anhydride dissolved in 2089 cc. ethylene dichloride, plus 6.59 grams benzoyl peroxide (0.5 mole percent, based on reacting monomers). The autoclave bomb was pressured to 100 pounds per square inch gauge (p.s.i.g.) with ethylene, rocked at room temperature for 10 minutes and the ethylene was vented. This was twice more repeated. By this flushing procedure the reaction mixture was freed of any dissolved air. The bomb was then charged with sufficient ethylene to give an estimated 200 p.s.i.g. pressure on heating to the chosen reaction temperature of 80° C.

Rocking of the bomb was started, and the temperature brought up to 80° C. by means of an electrically heated jacket. Additional ethylene was charged into the bomb from time to time to maintain the bomb pressure at approximately 200 p.s.i.g.

After about 18 hours, during which time absorption of ethylene had ceased, unreacted ethylene was vented, the total reaction mixture filtered, the separated ethylene/maleic anhydride copolymer washed several times with ethylene dichloride while filtering, and the polymer was then dried at 100° C. for 24 hours under the full vacuum of a water aspirator. The yield of polymer was 97.2 percent of theory, based on 100% of the maleic anhydride being copolymerized with ethylene in 1:1 mole ratio.

The specific viscosity of this copolymer, as well as that of the copolymers reported in the following examples, was determined by modification of ASTM method D–445–46T, method B, using an Ostwald viscosimeter. The polymer was dissolved in 1 weight percent concentration in dimethylformamide, and the specific viscosity determined at 25° C.

The specific viscosity of the copolymer produced in this control was 0.16.

*Butyric acid*

In exactly the manner described in the control above, under the same temperature and pressure conditions, and with the same quantities of maleic anhydride and ethylene dichloride, and with the same flushing, reaction technique and workup procedure for recovering final polymer product, copolymerization of ethylene with maleic anhydride was carried out in the presence of 37.8 grams n-butyric acid (11 weight percent, 7.9 mole percent, based on reacting monomers). Benzoyl peroxide used was 9.9 grams (0.75 mole percent), but an increase in catalyst of this magnitude (over that used in the control) would not significantly affect the molecular weight of the polymer. Total time was 21 hours, but the absorption of ethylene had ceased after about 18.5 hours.

The ethylene/maleic anhydride copolymer was obtained in a yield of 97.8% of theory, and had a specific viscosity of 0.13.

*Propionic acid*

In the same manner, at the same conditions, and with the same quantities of materials except that 20 mole percent (based on reacting monomers) of propionic acid was used instead of the butyric acid, ethylene/maleic anhydride copolymer having a specific viscosity of 0.126 was obtained in a yield of 100% of theory.

*Valeric acid*

In the same manner, at the same conditions, and with the same quantities of materials except that 20 mole percent (based on reacting monomers) of valeric acid was used, ethylene/maleic anhydride copolymer having a specific viscosity of 0.078 was obtained in a yield of 29.3% of theory. This is an extremely low molecular weight polymer, not otherwise readily obtained, hence for some purposes the low yield can be tolerated from the economic standpoint. Of course, unreacted ethylene and maleic anhydride can be recovered for re-use, and the yield can be increased by increasing the concentration of catalyst or adding catalyst intermittently or continuously during the polymerization.

The low molecular weight ethylene/maleic anhydride copolymers thus produced are excellent thinners and deflocculants for aqueous base oil well drilling muds when added thereto at the rate of from 1 to 4 pounds of copolymer per 42-gallon barrel of mud.

While the invention has been described with particular reference to various preferred embodiments thereof, it will be appreciated that numerous modifications and variations are possible without departing from the invention in its broadest aspects.

I claim:

1. In the copolymerization of maleic anhydride with an olefin having from 2 to 4 carbon atoms in the presence of a free radical-promoting catalyst at a temperature within the range of 40–100° C. to form an olefin/maleic anhydride copolymer, the improvement which comprises effecting said copolymerization in a non-aqueous reaction mixture comprising a liquid organic solvent and at least 5 mole percent based on the reacting monomers of a hydrocarbon carboxylic acid free from aliphatic unsaturation and having at least one hydrogen atom on an $\alpha$-carbon.

2. In the copolymerization of maleic anhydride with ethylene in the presence of a free radical-promoting catalyst at a temperature within the range of 40–100° C. to form ethylene/maleic anhydride copolymer, the improvement which comprises effecting said copolymerization in a non-aqueous reaction mixture comprising a liquid organic solvent and at least 5 mole percent based on the reacting monomers of a hydrocarbon carboxylic acid free from aliphatic unsaturation and having at least one hydrogen atom on $\alpha$-carbon.

3. In the copolymerization of maleic anhydride with propylene in the presence of a free radical-promoting catalyst at a temperature within the range of 40–100° C. to form propylene/maleic anhydride copolymer, the improvement which comprises effecting said copolymerization in a non-aqueous reaction mixture comprising a liquid organic solvent and at least 5 mole percent based on the reacting monomers of a hydrocarbon carboxylic acid free from aliphatic unsaturation and having at least one hydrogen atom on $\alpha$-carbon.

4. In the copolymerization of maleic anhydride with isobutylene in the presence of a free radical-promoting catalyst at a temperature within the range of 40–100° C. to form isobutylene/maleic anhydride copolymer, the improvement which comprises effecting said copolymerization in a non-aqueous reaction mixture comprising a liquid organic solvent and at least 5 mole percent based on the reacting monomers of a hydrocarbon carboxylic acid free from aliphatic unsaturation and having at least one hydrogen atom on $\alpha$-carbon.

5. In the copolymerization of ethylene with maleic anhydride in the presence of a free radical-promoting catalyst at a temperature within the range of 40–100° C. to form an ethylene/maleic anhydride copolymer, the improvement which comprises effecting said copolymerization in a non-aqueous reaction mixture comprising a liquid organic solvent and at least 5 mole percent based on the reacting monomers of an alkanoic acid having at least one hydrogen atom on $\alpha$-carbon.

6. In the copolymerization of ethylene with maleic anhydride in the presence of a free radical-promoting catalyst at a temperature within the range of 40–100° C. to form an ethylene/maleic anhydride copolymer, the improvement which comprises effecting said copolymerization in a non-aqueous reaction mixture comprising a liquid organic solvent and at least 5 mole percent based on the reacting monomers of valeric acid.

7. A process which comprises subjecting maleic anhydride maintained under an ethylene pressure of at least 200 pounds per square inch and at a temperature within the range of 60 to 80° C. to polymerization in a non-aqueous reaction mixture comprising a liquid organic solvent with the aid of a peroxide catalyst present in an amount of at least 0.5 mole percent based on the reacting monomers plus a hydrocarbon carboxylic acid free from aliphatic unsaturation and having at least one hydrogen atom on $\alpha$-carbon, present in an amount of at least 5 mole percent based on the reacting monomers, and recovering as a product of the process an ethylene/maleic anhydride copolymer having a specific viscosity as determined in 1 weight percent solution in dimethylformamide at 25° C. of not in excess of about 0.2.

8. A process according to claim 7 in which said carboxylic acid is valeric acid.

9. A process according to claim 7 in which said carboxylic acid is butyric acid.

10. A process which comprises subjecting maleic anhydride maintained under an ethylene pressure of at least 200 pounds per square inch and at a temperature within the range of 60 to 80° C. to polymerization in a non-aqueous reaction mixture comprising a liquid chlorinated aliphatic hydrocarbon solvent with the aid of a peroxide catalyst present in an amount of at least 0.5 mole percent based on the reacting monomers plus a hydrocarbon carboxylic acid free from aliphatic unsaturation and having at least one hydrogen atom on $\alpha$-carbon, present in an amount of at least 5 mole percent based on the reacting monomers, and recovering as a product of the process an ethylene/maleic anhydride copolymer having a specific viscosity as determined in 1 weight percent solution in dimethylformamide at 25° C. of not in excess of about 0.2.

11. A process according to claim 10 wherein said solvent is ethylene dichloride.

References Cited in the file of this patent

UNITED STATES PATENTS

| | | |
|---|---|---|
| 2,378,629 | Hanford | June 19, 1945 |
| 2,396,785 | Hanford | Mar. 19, 1946 |
| 2,457,229 | Hanford et al. | Dec. 28, 1948 |
| 2,646,425 | Barry | July 21, 1953 |
| 2,675,370 | Barrett | Apr. 13, 1954 |

OTHER REFERENCES

Raff et al.: Polyethylene, Interscience (1956), pp. 109–112.

Noller: Chemistry of Organic Compounds, Saunders (1951), page 738.